Sept. 7, 1954   R. W. LEATZOW   2,688,467
DEVICE FOR COOLING BEVERAGES AND THE LIKE
Filed April 10, 1953
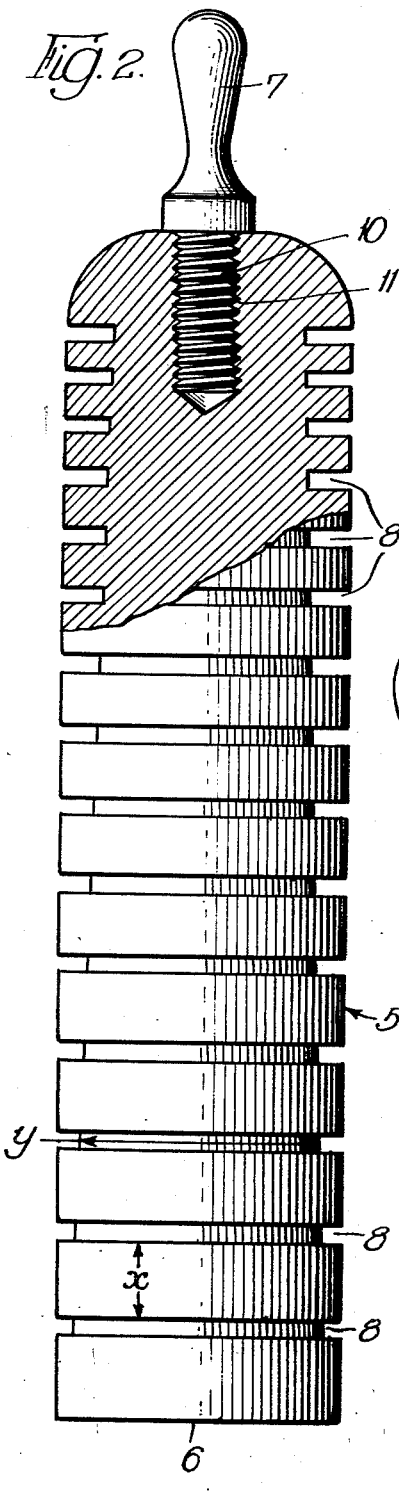
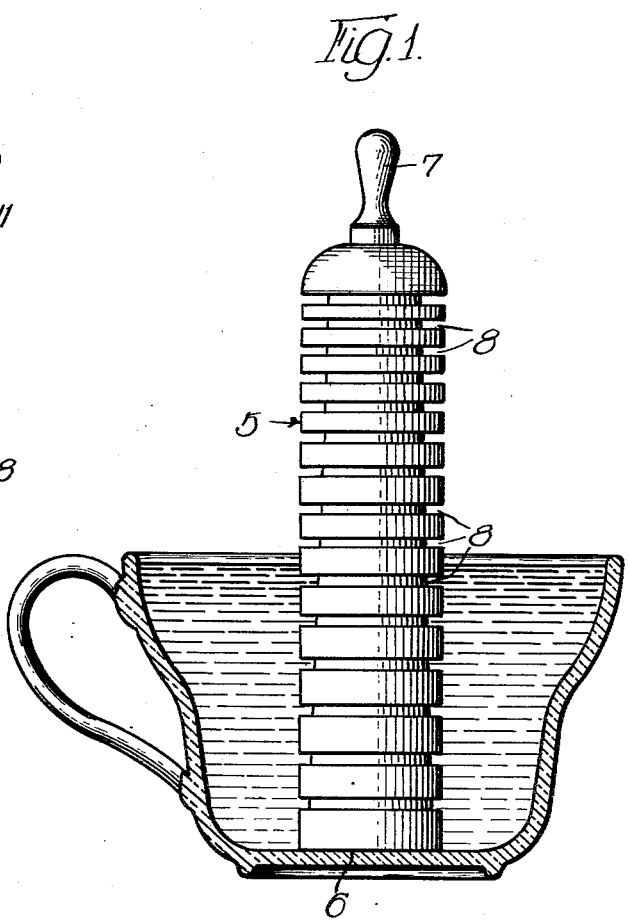
INVENTOR.
Robert W. Leatzow,
BY Brown, Jackson,
Boettcher & Dienner
attys.

Patented Sept. 7, 1954

2,688,467

UNITED STATES PATENT OFFICE 2,688,467

DEVICE FOR COOLING BEVERAGES AND THE LIKE

Robert W. Leatzow, Chicago, Ill.

Application April 10, 1953, Serial No. 347,907

2 Claims. (Cl. 257—263)

The present invention relates to a device for quickly cooling beverages and the like. More particularly, the device is intended primarily for quickly cooling a cup of coffee, cup of tea, bowl of soup, or other beverage, food, etc.

Many persons who cannot drink hot coffee, hot soup or the like without extreme discomfort and possible injury to the mouth or throat, suffer much delay and vexatious inconvenience in getting the liquid cooled to a temperature tolerable to them. This is particularly true of the black coffee drinker who would not consider adding cream, milk or water to his coffee solely for the purpose of cooling it quickly. Other persons who are capable of drinking relatively hot liquids without discomfort must still cool extremely hot coffee or the like, such as by adding a cooling liquid, or by having it "saucered and blowed," or must sip it slowly. The commuter rushing for the morning train, and other persons who must eat in a hurry, frequently have need for some means for quickly cooling a cup of coffee or the like.

The device of my invention is in the form of a heat dissipating standard which is adapted to be placed directly in the coffee cup or soup bowl, with the lower end immersed in the liquid and resting on the bottom of the cup or bowl, and with the upper end projecting above the level of the liquid for dissipating heat to the atmosphere. This heat dissipating device is composed of a material having very high heat conductivity, such as aluminum, and is preferably in the form of a cylindrical device so as to afford the optimum relationship between a relatively large surface area for obtaining maximum heat absorption and a relatively small volume for minimizing displacement of the liquid.

Another distinctive feature of my invention resides in an improved exterior formation of the standard for the purpose of obtaining a greater mass of metal in the lower part of the standard for absorbing heat from the liquid, and a greater surface area on the upper part of the standard for radiating or dissipating this heat to the atmosphere. This improved relationship is preferably obtained by providing a series of successive circular grooves around the cylindrical standard, the spacing between successive grooves diminishing from the bottom toward the top of the standard, and the depth of successive grooves increasing from the bottom toward the top of the standard. Secured to the upper end of the standard is a small handle or knob of plastic or other like material of low heat conductivity which enables the device to be lifted out of the liquid after cooling without burning the fingers.

The cooling action of my device can be greatly accelerated by placing it in a refrigerator for a few minutes before inserting it into the hot liquid, but this precooling of the device is not essential.

Other features, objects and advantages of the invention will appear from the following detail description of one preferred embodiment thereof. In the accompanying drawing illustrating such embodiment:

Figure 1 is a sectional view through a conventional coffee cup showing the general position occupied by my improved cooling device when inserted into a cup of coffee; and Figure 2 is a view partly in elevation and partly in section illustrating the device on a larger scale.

The heat dissipating body of the device is preferably in the form of an elongated solid cylinder 5, having a flat bottom 6 at its lower end and a heat insulating handle 7 secured to its upper end. This cylinder or standard 5 is composed of a material having a relatively high heat conductivity, preferably aluminum, although other suitable metals, alloys, etc. may be employed.

Formed at spaced levels or heights along the length of the standard are successive circular grooves 8 which, by their spacing and depth, proportion the mass of metal in the standard compared to the exposed surface area of the standard, at that particular height or level. The spacing between successive grooves, indicated at $x$, preferably diminishes at successively higher levels along the standard; whereas the depth of successive grooves, indicated at $y$, preferably increases at successive levels upwardly along the standard. Thus, the lower part of the standard which is immersed in the liquid has the greater mass of metal for absorbing heat from the liquid, whereas the upper part of the standard projecting above the level of the liquid has the greater surface area for dissipating heat to the atmosphere by radiation, convection, etc.

The upper handle or knob 7 is shown as having a threaded shank 10 which is screwed down into a threaded bore 11 formed in the upper end of the cylinder. Thus, this handle can be removed and replaced very easily, which might be desirable on some occasions, particularly if the handle is composed of a plastic or other material which might be injured by scalding or sterilizing temperatures to which it may be desired to subject the device periodically.

When it is desired to obtain the highest rate of cooling possible, the device is preferably placed in a refrigerator for a few minutes before being put into use. As illustrative of the rapidity of cooling which can be obtained with such a device after it has been precooled, a model constructed of the material and proportions above described has cooled an average cup of coffee from a high temperature of approximately 188° F. down to a tolerable temperature of under 150° F., in approximately 1½ minutes, after the device has been cooled in a refrigerator for approximately 5 minutes. The average time for effecting the normal cooling of the same cup of coffee from a high temperature of 188° F. to a temperature under 150° is in excess of 6 minutes.

While the step of precooling in the refrigerator or other cooling area is desirable where permitted by time and the proximity of the refrigerator, it is, of course, to be understood that the device still remains extremely effective for rapidly cooling a liquid even without the preliminary step of it being precooled. The high heat absorption of the device and its high heat conductivity, together with the very large surface area effective above the liquid level for dissipating heat by radiation, convection, etc., insures that the liquid will be cooled in a much shorter time than the conventional or average time for cooling in the absence of such a device.

While I have illustrated and described what I regard to be the preferred embodiment of my invention, nevertheless it will be understood that such is merely exemplary and that numerous modifications and rearrangements may be made therein without departing from the essence of the invention.

I claim:

1. A device of the class described for cooling beverages, soup or the like comprising a substantially cylindrical standard composed of a metal having high heat conductivity and having a bottom resting surface adapted to be set on the bottom of the cup, bowl or the like containing the liquid to be cooled, in which position the lower portion of said member is immersed in the liquid and the upper portion projects above the liquid for radiating heat to the air, and a plurality of circular grooves formed in said standard at different levels from the bottom to the top, the spacing between successive grooves diminishing from the bottom toward the top of said standard, and the depth of successive grooves increasing from the bottom toward the top of said standard.

2. A device of the class described for cooling beverages, soup or the like comprising a substantially cylindrical standard composed of a metal having high heat conductivity and having a bottom resting surface adapted to be set on the bottom of the cup, bowl or the like containing the liquid to be cooled, in which position the lower portion of said member is immersed in the liquid and the upper portion projects above the liquid for radiating heat to the air, a plurality of circular grooves formed in said standard at different levels from the bottom to the top, the spacing between successive grooves diminishing from the bottom toward the top of said standard, and the depth of successive grooves increasing from the bottom toward the top of said standard, and a handle secured to the upper end of said standard by which the device is adapted to be inserted into the liquid and removed therefrom, said handle being composed of a material of low heat conductivity and being readily separable from said standard.

References Cited in the file of this patent

UNITED STATES PATENTS

| Number | Name | Date |
|---|---|---|
| 1,758,815 | Abbott | May 13, 1930 |
| 2,639,590 | Schramm | May 26, 1953 |